United States Patent Office 2,828,294
Patented Mar. 25, 1958

2,828,294

RESINOUS PRODUCTS AND A METHOD OF MAKING SAME

Arthur Ullrich, Neckargemuend, Germany

No Drawing. Application January 25, 1955
Serial No. 484,076

Claims priority, application Germany January 29, 1954

3 Claims. (Cl. 260—85.3)

The present invention relates to resinous products and more particularly to resinous products derived from extractive matter obtained on selectively extracting petroleum or the like mineral oils, and to a process of making same.

It is known to produce base materials for the lacquer and drying oil industry by reacting, at elevated temperature, extracts obtained on treating lubricating fractions of mineral oils with selectively acting solvents, such as sulfur dioxide and others, and especially with furfural, with nitrating agents, for instance, with concentrated nitric acid, preferably in mixture with other strong mineral acids, such as concentrated sulfuric acid. Thereby considerable nitration of such extracts takes place.

It is one object of the present invention to provide new and valuable highly viscous or resinous products from selective extracts of mineral oils and hydrocarbons of the type and composition of such selective extracts, such hydrocarbons being derived, for instance, from lignite tar oil, hard coal tar oil, wood oil, and the like, and especially from selective extracts obtained from lubricating fractions of mineral oils.

Another object of this invention is to provide a simple and effective process of preparing such highly viscous or resinous products with valuable physical and chemical properties.

A further object of this invention is to provide highly viscous or resinous products with valuable chemical and physical properties and to compound such products with natural or synthetic rubber, to use them as dispersing, gelatinizing, plasticizing, and softening agents for various plastifiable materials, such as resins, cellulose derivatives, chlorinated rubber, polymerization products, such as polyvinyl compounds, for instance, polymerization products of vinyl chloride which may subsequently be chlorinated, furthermore of vinyl acetate, vinyl chloro acetate, vinyl alkyl ethers, vinyl alkyl thioethers, vinyl acetylene, divinyl acetylene, vinyl alkyl ketones, acrylic acid ester, methacrylic acid esters, styrene, butadiene, isoprene, isobutylene, and the like, and of mixtures of such products. Said new highly viscous or resinous products may also serve as basic ingredients of lacquers, as binding agents or for making binding agents, impregnating agents, protective coatings, for the production of insulating plates and sheets in combination with cement, of tar paper, and of plastic materials.

Other objects of this invention and advantageous features thereof will become apparent as the description proceeds.

In principle, the process according to this invention comprises treating selective extracts of mineral oils or hydrocarbons of the type and composition of such selective extracts derived from lignite tar oils, hard coal tar oils, wood tar oils and the like, with nitric acid of a concentration having no nitrating effect, such as a nitric acid of a concentration between about 40% and about 60%. Especially suitable for this purpose has proved to be 50% nitric acid.

As starting materials for the process according to the present invention there are preferably used high boiling extracts of mineral oils obtained by selectively extracting said mineral oils and especially petroleum fractions in the kerosene and heavier boiling ranges by means of suitable solvents. Conventionally used solvents for this purpose are, for instance, liquid sulfur dioxide, as employed in the Edeleanu-process, nitrobenzene, propane, phenol, $\beta,\beta$-dichloro ethyl ether (Chlordex), furfural and others. Especially suitable extracts of this type start to distill at least at about 250° C., whereby at least about 65% of their constituents distill above 360° C. Said extracts are furthermore characterized by their solubility in concentrated and fuming sulfuric acid wherein they are soluble to at least 40%. Preferred are such extracts or fractions of extracts which are substantially completely soluble in concentrated sulfuric acid. A suitable material of this type of selective mineral oil extracts is known as naftolene and consists of unsaturated vulcanizable hydrocarbons which boil between about 200° C. and 380° C. The higher the viscosity of said extracts, the more valuable are the resulting resinous reaction products, for instance, for use as dispersing agents in rubber compositions. Therefore, it is of advantage to use extracts or fraction of extracts as starting materials for reaction with nitric acid that have previously been subjected to a distillation operation. Thereby constituents of said extracts of lower boiling point are removed and the viscosity of the extract is increased.

Especially suitable selective extracts of mineral oils are extracts obtained by selective extraction with furfural. Preferred fractions of such extracts contain considerable amounts of aromatic compounds, and primarily naphthenes of varying compositions and high-boiling resinous products containing carbon, hydrogen, and oxygen in the approximate proportion of 80:10:5. Said resinous products consist also of cyclic naphthenic compounds which, according to our present knowledge, are apparently interlinked with each other by acyclic hydrocarbon bridges. Such extracts are unsaturated and have a comparatively high iodine number (100 to 120 or even higher).

As starting materials there may also be used distillates and fractions of extracts and hydrocarbons of similar composition as they are obtained by selective extraction or distillation of lignite tar oils, shale oils, and other tar oils. Oils as they are obtained on chemical refining of petroleum and the like by means of sulfuric acid and on neutralizing and distilling of acid sludge are also suitable. The preferred starting materials are, however, the selective extracts obtained from petroleum.

Extracts of such type are treated according to the present invention with non-nitrating nitric acid and preferably with nitric acid of a concentration between 50% and 60%.

The reaction temperature is preferably at least 80° C. and, more advantageously, around about 90° C. and should not exceed about 120° C. Reaction at lower temperature and even at room temperature is, however, also possible whereby the nitric acid must, of course, be allowed to react with said extract for a longer period of time. In general, the end point of the reaction is reached when about 50% of the nitric acid added are consumed and a brown to black resinous mass is obtained which becomes brittle in the cold. Unreacted nitric acid is preferably removed by heating the reaction mixture to about 140° C. to evaporate said acid. Removal of said excess acid may also be effected by washing and/or neutralization of the reaction mixture.

The reaction products of selective extracts of mineral oils with nitric acid are, in general, brown to black resinous products which become brittle in the cold, which have a softening point of at least 50° C. (measured by the ring and ball method), and which are soluble in benzene, benzine, chloroform, and ethanol. Resins having a softening point of 60° C. and higher are the preferred ones. The invention, however, is not limited to such resinous compounds but comprises any reaction product obtained by subjecting to the action of non-nitrating nitric acid extractive matter obtained by selective extraction of mineral oils and containing a mixture of compounds of which polycyclic naphthenic compounds and high molecular unsaturated compounds as well as petroleum resins may especially be mentioned. Said selective extracts contain also certain amounts of aromatic compounds depending upon their origin. As is evident, the starting selective mineral oil extracts represent a mixture of a number of chemically different compounds which, by the action of nitric acid, are resinified to new and valuable resinous products.

While the course of reaction taking place during said treatment with non-nitrating nitric acid is not intended to be limited to any particular theory, it is believed that no substantial introduction of nitro groups into the mixture of compounds of the starting material takes place but that, for instance, the oxidizing effect of nitric acid splits open the naphthene and other polycyclic ring systems whereby oxygen containing hydrocarbons are formed. Formation of polynitro aromatic compounds does not take place since such polynitration ordinarily requires the use of strongly acting nitrating agents, especially of mixtures of highly concentrated nitric acid and concentrated sulfuric acid, whereby the oxidizing action of nitric acid is suppressed. In contrast hereto nitric acid in the concentration and under the conditions used exerts mainly an oxidizing effect. It appears to be essential for the production of suitable dispersing agents according to this invention to use for such a reaction mixtures of compounds, such as they are present in said selective mineral oil extracts obtained by furfural, sulfur dioxide, and the like extraction, because only the reaction products of such mixtures are capable of improving the properties of rubber compositions by facilitating incorporation of reinforcing agents and fillers into such rubber compositions and replacing part of the rubber in such rubber compositions by said mixtures.

The following examples serve to illustrate the production of the new resinous products.

It is to be understood, of course, that the invention is not limited to the precise mode of procedure hereinafter described as the invention, as defined in the appended claims, can be embodied in a plurality and variety of forms and can be practiced in a plurality and variety of ways.

Starting materials for Examples 1, 2, and 3: Furfurol extracts obtained on refining mineral oil having the following characteristic properties are used as starting material in Examples 1, 2, and 3.

|  | Example | | |
| --- | --- | --- | --- |
|  | 1 | 2 | 3 |
| Density at 20° C | 1.000–1.012 | 1.005–1.016 | 0.979 (at 60° C.). |
| Viscosity according to Engler at 99° C. | 7.4–9.5 | 18–27 | 2.96. |
| Hard asphalt content | 0.03% | 0.02% | 0.02%. |
| Flash point | 265° C | 280° C | 229° C. |
| Neutralization number | 0.07 | 0.04 | 0.00. |
| Saponification number | 0.49 | 0.56 | 0.36. |
| Reflected color | greenish | greenish | greenish. |
| Ash content | 0.044% | 0.029% | 0.022%. |
| Carbon content | 86.79% | 86.61% | 87.70%. |
| Hydrogen content | 9.55% | 10.13% | 9.90%. |
| Nitrogen content | 0.44% | 0.57% | 0.45%. |

Distillation characteristics:

|  | Example | | |
| --- | --- | --- | --- |
|  | 1 | 2 | 3 |
| Begin of distillation ° C | 295 | 254 | 283 |
| 300° C percent | 1.0 | 4.0 | 0.5 |
| 310° C do | 1.5 | 6.0 | 0.8 |
| 320° C do | 2.0 | 8.0 | 1.0 |
| 330° C do | 3.0 | 10.0 | 2.0 |
| 340° C do | 5.0 | 13.0 | 4.0 |
| 350° C do | 7.0 | 16.5 | 7.0 |
| 360° C do | 17.5 | 25.0 | 14.0 |

*Example 1*

125 cc. of 50% nitric acid are added within 5 hours to 405 g. of the above characterized extract No. 1 while stirring. The reaction temperature is kept between 80° C. and 100° C. during acid addition. The temperature is then increased to 130–140° C. and the reaction mixture is stirred at said temperature for about 1 hour to complete the reaction. At the beginning of the reaction considerable foaming takes place. The reaction proceeds exothermically. 460 g. of a porous reddish brown resinous mass are obtained. Softening point: 56.8° C.

The resin contains a small amount of nitrogen which is due to entrained nitric acid.

*Example 2*

135 cc. of 50% nitric acid are added, within 6 hours, at a temperature between 90° C. and 110° C. to 415 g. of the above characterized extract No. 2, while stirring. After acid addition, the temperature is increased to 130–140° C. and the reaction mixture is kept at said temperature for 1 hour. The reaction proceeds exothermically. The reaction mixture, however, does not foam as strongly as that of Example 1. 472 g. of a reddish brown, brittle-hard resinous mass is obtained. Softening point: 70.6° C.

*Example 3*

180 cc. of 50% nitric acid are added, at the beginning drop by drop, to 440 g. of the above characterized starting material, while stirring. Altogether 6 hours are required for adding the nitric acid while the reaction mixture is kept at a temperature of about 90° C. and the temperature is increased only during the last two hours to 130–140° C. The reaction proceeds strongly exothermically.

The yield of the reaction product, after washing with water, is 460 g. Softening point: 63° C.

Fractions of said selective extracts or mixtures of said extracts or of fractions thereof with other hydrocarbons, such as plasticizers, vinyl polymerizates and others may be treated in the same manner according to the process of this invention.

The resinous reaction products, as stated hereinbefore, can be used as such for many purposes. They can also be employed in emulsified condition or in mixtures with other oils or resins or in solution in suitable solvents. They are especially suitable as dispersing agents for compounding with natural and synthetic rubber. In emulsified condition, they are added to natural latex or latex-like emulsions of synthetic rubber.

Use of the resinous products according to the present invention as dispersing agents in rubber compounding considerably improves, for instance, the tearing strength or ultimate strength, elongation at break, modulus of elasticity on impact, and the resistance to wear or abrasion. Said dispersing agents, furthermore, impart excellent aging properties and resistance to cold to vulcanized rubber articles compounded therewith. When applying to such rubber articles dynamic bending stress, fatiguing failure is observed at a considerably later time than with rubber articles not having incorporated therein dispersing agents according to the present invention.

Said dispersing agents have the further characteristic property that they are capable of forming gels with polyvinylchloride on heating. This property allows incorporation of much greater amounts of said polymer into rubber compositions than heretofore possible. Said high dissolving power of dispersing agents according to this invention is not limited to polyvinylchloride. Other polyvinyl resins, such as polyvinyl acetate and other polyvinyl esters, polyacrylic and polymethacrylic acid esters, styrene polymers are also dissolved and gelified by said agents and, thus, readily and intimately dispersed throughout and thoroughly compounded with rubber compositions.

The extracts to be reacted with 50% to 60% nitric acid according to the present invention may be purified before such reaction or, as stated hereinbefore, only specific fractions or part of fractions of the selective extracts or the selective extracts, fractions thereof, or mixture of such fractions or extracts in mixture with other hydrocarbons may be subjected to the action of non-nitrating nitric acid according to the present invention. The reaction products themselves can be purified, for instance, by distillation or extraction or the like. Reaction with non-nitrating nitric acid can also be carried out under pressure and/or in the presence of other oxidation agents and/or oxidation catalysts.

Of course, many changes and variations in the starting materials, the reaction conditions, nitric acid concentration and amounts, reaction temperature and duration, methods of working up and of purifying the reaction products, and the like may be made by those skilled in the art in accordance with the principles set forth herein and in the claims annexed hereto.

I claim:
1. In a process of producing resinous products, the steps comprising gradually adding nitric acid of a concentration between about 40% and about 60% at atmospheric pressure and at a temperature between about 80° C. and about 120° C. to an extract obtained on selectively extracting high boiling fractions of mineral oils by means of furfural and heating the reaction mixture, after the addition of the nitric acid, to a temperature between about 130° C. and about 140° C. to complete resinification.

2. In a process of producing resinous products, the steps comprising gradually adding nitric acid of a concentration between about 40% and about 60% at atmospheric pressure and at a temperature between about 80° C. and about 120° C. to an extract obtained on selectively extracting high boiling fractions of mineral oils by means of selectively acting solvents and heating the reaction mixture, after the addition of the nitric acid, to a temperature between about 130° C. and about 140° C. to complete resinification.

3. In a process of producing resinous products, the steps comprising gradually adding nitric acid of a concentration between about 40% and about 60% at elevated temperature not exceeding about 120° C. to an extract obtained on selectively extracting high boiling fractions of mineral oils by means of selectively acting solvents and heating the reaction mixture, after the addition of the nitric acid, at an increased temperature not exceeding about 140° C. to complete resinification.

References Cited in the file of this patent

UNITED STATES PATENTS

| | | |
|---|---|---|
| 1,936,427 | Forrest et al. | Nov. 21, 1933 |
| 2,184,325 | Sweeney | Dec. 26, 1939 |
| 2,511,454 | Bishop et al. | June 13, 1950 |

FOREIGN PATENTS

| | | |
|---|---|---|
| 714,377 | Great Britain | Aug. 25, 1954 |